(12) United States Patent
Koshimizu

(10) Patent No.: US 6,773,158 B2
(45) Date of Patent: Aug. 10, 2004

(54) RESONANT CIRCUIT FOR MEASURING TEMPERATURE PROFILE OF A SEMICONDUCTOR SUBSTRATE

(75) Inventor: Chishio Koshimizu, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/203,815

(22) PCT Filed: Jan. 29, 2001

(86) PCT No.: PCT/JP01/00564

§ 371 (c)(1),
(2), (4) Date: Aug. 14, 2002

(87) PCT Pub. No.: WO01/65224

PCT Pub. Date: Sep. 7, 2001

(65) Prior Publication Data

US 2003/0012255 A1 Jan. 16, 2003

(30) Foreign Application Priority Data

Feb. 29, 2000 (JP) ........................ 2000-054523

(51) Int. Cl.[7] ................................ G01K 7/00
(52) U.S. Cl. ................ 374/117; 374/149; 374/166; 374/184; 392/418; 118/729; 438/10; 219/494; 432/32; 414/148; 414/939
(58) Field of Search ................ 374/117, 184, 374/183, 163, 166, 124, 120, 149, 141, 118; 438/17, 18, 10, 11, 5; 427/10; 219/494, 506, 510, 516, 521; 432/239, 45, 253, 32; 118/729; 392/416, 418; 414/148, 939

(56) References Cited

U.S. PATENT DOCUMENTS

| | | | | |
|---|---|---|---|---|
| 4,340,796 A | * | 7/1982 | Yamaguchi et al. | ........ 374/117 |
| 5,466,614 A | * | 11/1995 | Yakura et al. | ............ 374/184 |
| 5,576,224 A | | 11/1996 | Yakura et al. | ............ 438/381 |
| 5,820,266 A | | 10/1998 | Fedak | .......... 374/179 |
| 6,002,991 A | * | 12/1999 | Conn, Jr. | .................. 702/117 |
| 6,111,520 A | * | 8/2000 | Allen et al. | .............. 374/184 |
| 6,188,050 B1 | * | 2/2001 | Duffer et al. | ............ 219/497 |

FOREIGN PATENT DOCUMENTS

| | | |
|---|---|---|
| EP | 0644409 | 3/1995 |
| JP | 06-331454 | 12/1994 |
| JP | 10-083965 | 3/1998 |
| JP | 10-142068 | 5/1998 |
| JP | 2000-003951 | 1/2000 |
| JP | 2000-100888 | 4/2000 |
| JP | 2000-124206 | 4/2000 |
| JP | 2000-138213 | 5/2000 |
| JP | 2000-315658 | 11/2000 |
| WO | 98/20316 | 5/1998 |

* cited by examiner

Primary Examiner—Diego Gutierrez
Assistant Examiner—Stanley J. Pruchnic, Jr.
(74) Attorney, Agent, or Firm—Crowell & Moring LLP

(57) ABSTRACT

In a method apparatus for measuring the temperature of a semiconductor substrate during processing thereof in a processing chamber, a resonant circuit formed on the substrate surface is energized by an electromagnetic field radiation device, and disturbances in the electromagnetic field are detected to determine the resonant frequency of the resonant circuit. The temperature of the substrate is determined as a function of the resonant frequency. The substrate is moved into and out of processing chamber by a transfer arm, and the radiation device is disposed on the transfer arm or mounted on the processing chamber. Multiple resonant circuits may be provided, which are energized by movement of the transfer arm, without transferring the substrate.

14 Claims, 12 Drawing Sheets

RESONANT CIRCUIT FOR MEASURING TEMPERATURE PROFILE OF A SEMICONDUCTOR SUBSTRATE

TECHNICAL FIELD

The present invention relates to a substrate temperature measuring method, substrate processing, substrate temperature measuring equipment, and semiconductor manufacturing equipment, which are preferably applicable to a semiconductor wafer (hereafter, wafer) in a process for manufacturing a semiconductor device, and to an LCD substrate in a process for manufacturing a liquid crystal display (LCD).

BACKGROUND ART

Recently, in the manufacturing of a semiconductor devices or liquid crystal displays (LCD), there is an increasing need for precision in forming a circuit pattern thereon. Accordingly, to improve their accuracy, various kinds of processes must be implemented under accurate temperature control of the wafer or LCD substrate.

Heretofore, for measuring a temperature of a wafer in the manufacturing of a semiconductor device or an LCD substrate in the manufacturing process of a liquid crystal display, it is well known to use a thermocouple or a radiation thermometer. However, the use of a thermocouple requires a secured contact of the thermocouple with a substrate whose temperature is to be measured, and a lead wire must be connected to the thermocouple. Furthermore, although noncontact temperature measurement can be advantageously carried out on the basis of radiant energy from a wafer, using a radiation thermometer, emissivity varies depending on the temperature, and stray light adversely affects the measurement. As a result, an accurate temperature measurement has been difficult.

To overcome the aforementioned problems, Japanese Patent Application Publication No. HEI 10-142068 discloses a temperature measuring method utilizing miniature temperature measuring equipment. Here, the miniature temperature measuring equipment comprises a temperature measuring portion, a controller, a memory, a processor, an antenna for transmitting/receiving data and an antenna for transmitting/receiving power, and is stuck on a wafer. Power to operate the controller and processor is supplied to the temperature measuring equipment from an external source by means of microwaves, thereby enabling the transmission of temperature measuring signals.

DISCLOSURE OF THE INVENTION

However, in the aforementioned existing method, electronic components such as the controller, the processor, the memory and the like must be assembled on the wafer whose temperature is to be measured. Characteristics of these electronic components themselves vary due to the temperature, which affects the temperature measuring signals that are sent out, resulting in an inaccurate temperature measurement.

One object of the present invention is to overcome the aforementioned existing problems.

Another object of the invention is to provide a substrate temperature measuring method, substrate processing, substrate temperature measuring equipment and semiconductor manufacturing equipment that are capable of measuring a substrate temperature more accurately than the existing method and processing the substrate with accuracy.

These and other objects and advantages are achieved by the substrate temperature measuring method and apparatus, as well as the manufacturing method and apparatus according to the invention, which utilize at least one resonant circuit disposed on a substrate. The temperature measuring method comprises the steps of converting electric energy into electromagnetic wave energy, irradiating the resonant circuit with the electromagnetic wave energy, detecting a voltage or a current associated with the electric energy, and obtaining a temperature of the substrate from a detected resonance frequency. The voltage or the current associated with the electric energy is detected to determine the resonance frequency of the resonant circuit.

The substrate processing according to the invention comprises measuring the temperature of a product substrate by means of a substrate temperature measuring method, and changing processing conditions to process the product substrate, on the basis of the temperature measurement. Here, the substrate temperature measuring method makes use of at least one resonant circuit disposed on the product substrate. The temperature measuring method comprises the steps of converting electric energy into electromagnetic wave energy, radiating the converted electromagnetic wave energy onto the resonant circuit, detecting a voltage or a current associated with the electric energy, and obtaining a temperature of the substrate from a detected resonance frequency. The voltage or the current involving the electric energy is detected to detect the resonance frequency of the resonant circuit.

In another embodiment of the substrate temperature measuring method and apparatus according to the invention a plurality of resonant circuits are disposed on a substrate. The method comprises the steps of converting electric energy into electromagnetic wave energy, moving an electromagnetic wave irradiation portion, detecting a voltage or a current, and obtaining from respectively detected resonant frequencies temperatures of a plurality of portions on the substrate. After the electric energy is converted into the electromagnetic wave energy, the electromagnetic waves comprising the converted electromagnetic wave energy are radiated from the electromagnetic wave irradiation portion toward the substrate. The voltage or the current involving the electric energy is detected during the movement, to detect resonance frequencies of each of the plurality of the resonant circuits.

Another embodiment of the temperature measuring equipment according to the invention comprises an electromagnetic wave irradiation portion, a resonance frequency detecting portion, and a temperature determining portion. In the electromagnetic wave irradiation portion, electric energy is converted into electromagnetic wave energy, which is radiated onto a resonant circuit on a substrate. In a resonance frequency detecting portion, a voltage or a current associated with the electric energy is detected to detect a resonance frequency of the resonant circuit. In a temperature determining portion, the temperature of the substrate is determined from the detected resonance frequency.

The semiconductor manufacturing equipment according to the invention comprises a substrate temperature measuring portion and a processing chamber for processing the substrate. The substrate temperature measuring portion has an electromagnetic wave irradiation portion, a resonance frequency detecting portion, and a temperature determining portion. In the electromagnetic wave irradiation portion, electric energy is converted into electromagnetic waves, which are radiated onto a resonant circuit on the substrate. In the resonance frequency detecting portion, a voltage or a current associated with the electric energy is detected to detect a resonance frequency of the resonant circuit, and a temperature determining portion determines a temperature of the substrate based on the detected resonance frequency.

According to the substrate temperature measuring method, the substrate processing, the substrate temperature measuring equipment and the semiconductor manufacturing equipment of the present invention, at least one resonant circuit disposed on the substrate is utilized. By the use of temperature dependence of a resonance frequency of the resonant circuit, a remote temperature measurement of the substrate can be implemented without disposing a complicated electronic circuit or the like on the substrate, and without coming into contact with the substrate. Furthermore, the substrate can be processed accurately.

Other objects, advantages and novel features of the present invention will become apparent from the following detailed description of the invention when considered in conjunction with the accompanying drawings.

BRIEF DESCRIPTION OF THE DRAWINGS

FIGS. 3A, 32, 3C, and 3D, continuation of FIGS. 2A through 2F are diagrams showing the steps for forming a resonant circuit utilized in the present invention;

BEST MODES FOR IMPLEMENTING THE INVENTION

In a preferable mode for implementing the substrate temperature measuring method according to the invention, the resonant circuit is directly formed on the substrate, or it may be adhered on the substrate. The resonant circuit is preferably 0.1 MHz to 1000 MHz in its resonance frequency.

Furthermore, according to a preferred embodiment for implementing the present invention, the substrate may be specially provided for temperature measurement, or it may be an actual product substrate.

In still another preferred embodiment for implementing the present invention, the substrate may be furnished with a plurality of resonant circuits thereon. Electromagnetic waves which make up the converted electromagnetic wave energy are irradiated from a plurality of electromagnetic wave irradiation portions onto the plurality of resonant circuits, respectively. The respective resonance frequencies are detected for each of the plurality of resonant circuits, and the substrate temperature is obtained from the detected resonance frequency for each the plurality of portions of the substrate.

Furthermore, as a preferable mode for implementing the present invention, the substrate exists in a substrate processing space. The substrate is transferred into and from the substrate processing space by means of a substrate transfer arm that carries the electromagnetic wave irradiation portion. The step of moving the electromagnetic wave irradiation portion is carried out, without transferring the substrate, by moving the substrate transfer arm.

Furthermore, as a preferable mode for implementing the present invention, the step of moving the electromagnetic wave irradiation portion is implemented after processing of the substrate in the substrate processing space is over.

Still further, as a preferable mode for implementing the present invention, the semiconductor manufacturing equipment according to the invention further comprises a substrate transfer arm for transferring the substrate into and from the processing chamber, which transfer arm includes the electromagnetic wave irradiation portion of the substrate temperature determining portion.

DETAILED DESCRIPTION OF THE INVENTION

Figure 1:
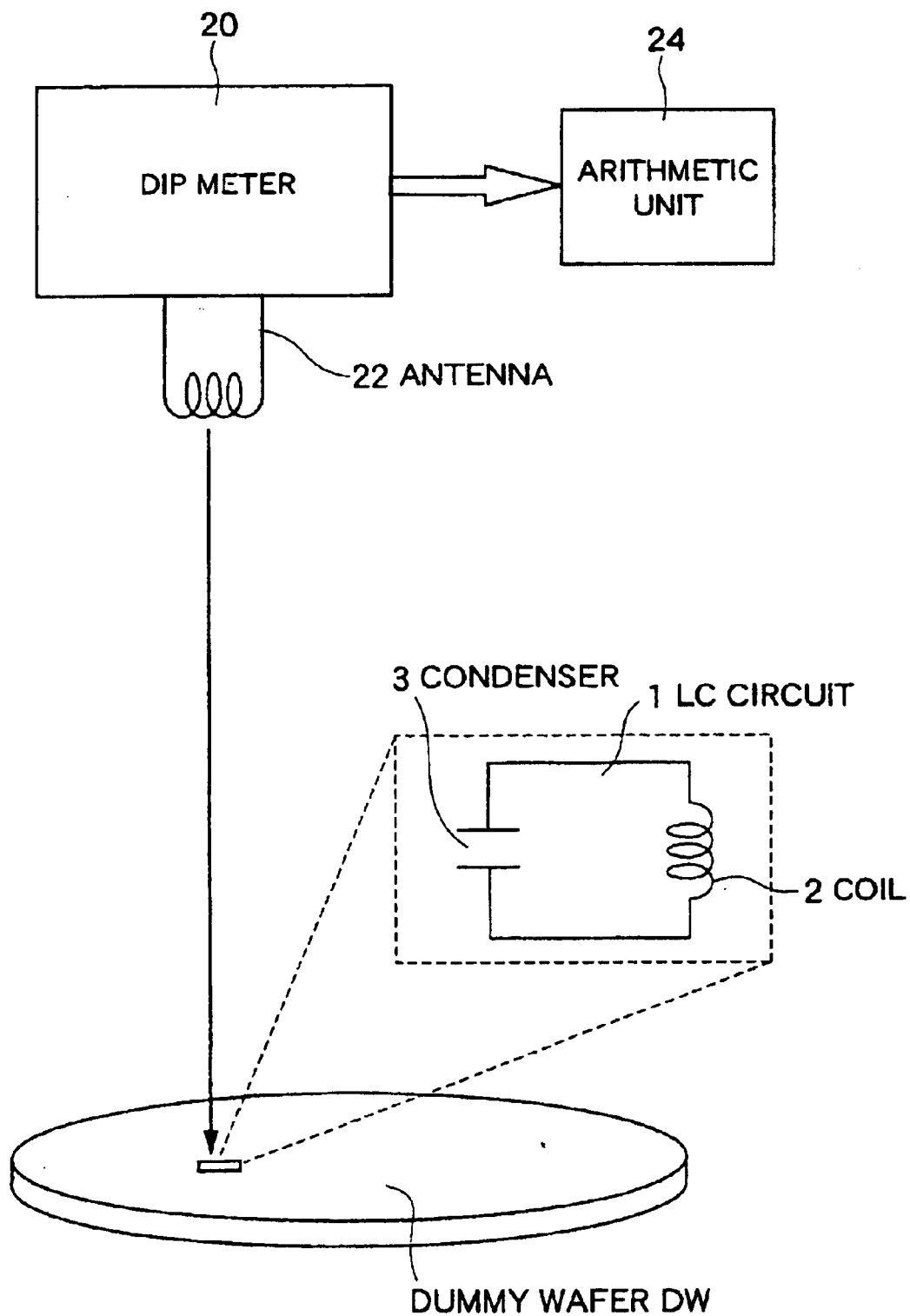
FIG. 1 is a conceptual drawing showing a temperature measuring method involving the present invention.

FIG. 1 shows schematically a temperature measuring method involving an embodiment of the present invention. As shown in the drawing, on a dummy wafer DW as a substrate, an LC circuit 1, constituted by a coil 2 and a condenser 3, is formed as a resonant circuit which resonates at a particular frequency that varies according to its temperature. The LC circuit 1 is formed directly on the dummy wafer DW by means of photolithography or the like, similar to the manufacturing of an ordinary semiconductor device.

According to the invention, dummy wafer DW, which is used only for temperature measurement, is configured in a shape similar to that of a product wafer used for actually manufacturing semiconductor devices. That is, similarly to a product wafer, the dummy wafer DW is disposed at a wafer mounting position in a processing chamber (such as for instance an oven for heat treatment, etching equipment, and CVD equipment). The equipment is operated in a manner similar to the actual processing, thereby actual temperature during the processing being measured.

FIGS. 2A through 2F and 3A through 3D, illustrate an example of steps of directly forming an LC circuit 1 on a dummy wafer DW using photolithography or the like.

Figure 2A:
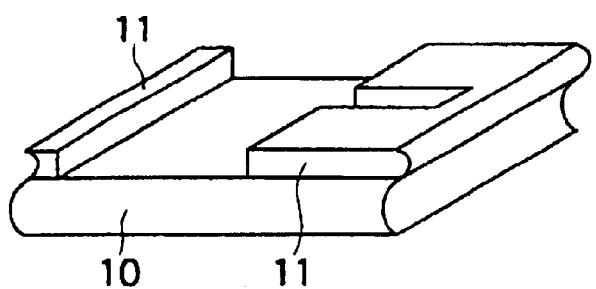
FIGS. 2A, 2B, 2C, 2D, 2E and 2F are diagrams showing the steps for forming a resonant circuit utilized in the present invention.
Figure 2B:
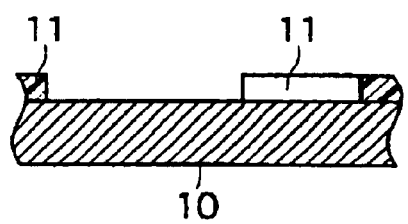

First, a photo resist 11 is uniformly coated on a Si layer 10 of the dummy wafer DW, for example by means of spin coat method. Thereafter, it is exposed through a mask having a prescribed pattern, and developed, so that the corresponding pattern is copied (FIGS. 2A and 2B).

Figure 2C:
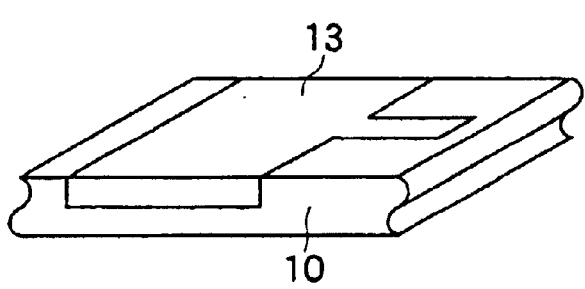
Figure 2D:
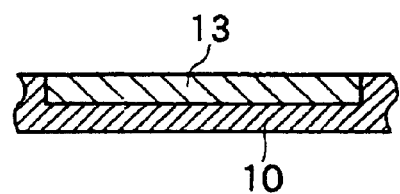

Next, with the photo resist 11 as a mask, impurity ions are implanted on the Si layer 10 to form a conductive region 13 of a prescribed shape, followed by ashing to remove the photo resist used as the mask (FIGS. 2C and 2D).

Figure 2E:
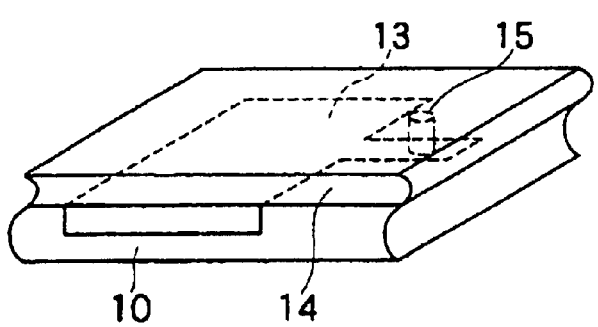
Figure 2F:
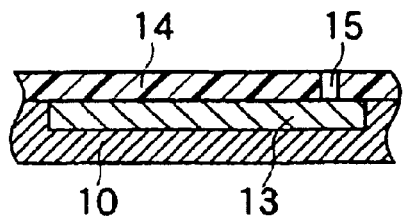

Then, a dielectric layer 14 (that is, a dielectric such as is provided in a condenser), made for instance of a $SiO_2$, is deposited on the dummy wafer DW by means of CVD method or the like. A contact hole 15 is formed on the $SiO_2$ layer 14, by means of photolithography or the like with the photo resist as a mask (FIGS. 2E and 2F).

Figure 3B:
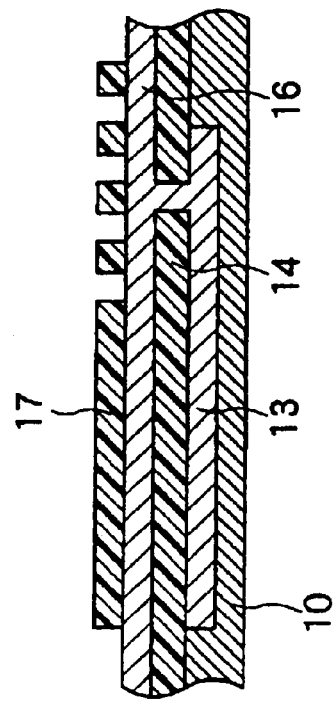
Figure 3D:
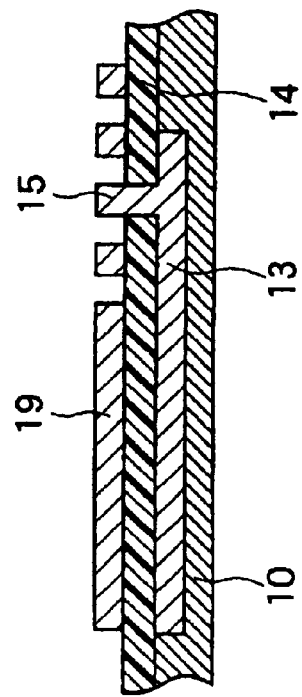
Figure 3A:
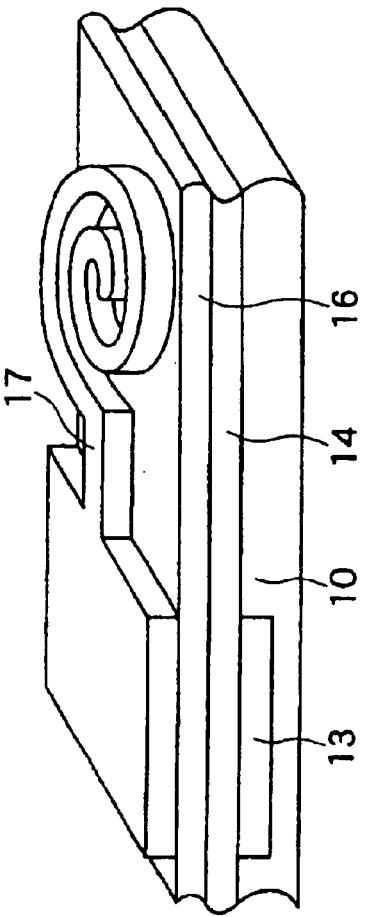

Following the above, on the $SiO_2$ layer 14 and in the contact hole 15, a conductive layer 16 that becomes an electrode layer, for instance a Poly-Si layer or an Al layer, is deposited by a CVD method or sputtering method. Thereafter, photo resist 17 is coated thereon, followed by exposing and developing, forming a photo resist pattern consisting of an approximately spiral coil portion, a planar condenser portion and an interconnection portion connecting them (FIGS. 3A and 3B).

Figure 3C:
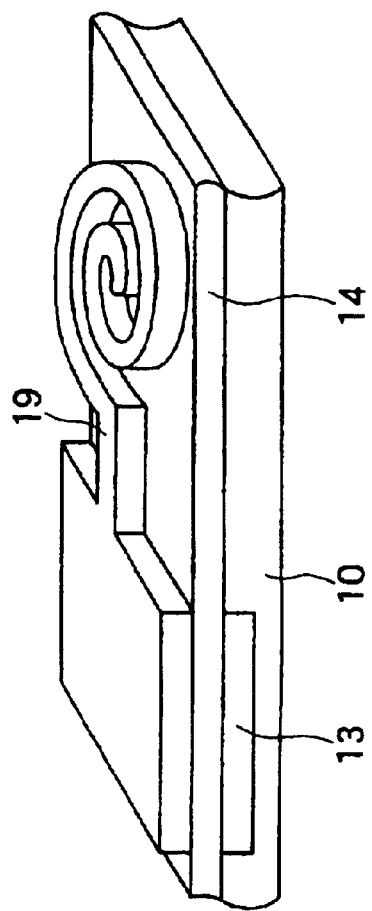

With the aforementioned photo resist pattern as a mask, the conductive layer 16 is etched, the photo resist is then removed by ashing. In this manner, a conductive layer pattern 19 consisting of an approximately spiral coil portion, a planar condenser portion and an interconnection portion is formed (FIGS. 3C and 3D).

In addition, as demands arise, a protective film is applied to the LC circuit thus formed.

Thus, on the dummy wafer DW, the conductive region 13 and the conductive layer pattern 19 are connected through the contact hole 15. (See FIG. 3D.) In addition, the conductive region 13 and the conductive layer pattern 19 are disposed with the $SiO_2$ layer 14 as the dielectric layer interposed, so that the LC circuit 1 having the spiral coil portion is directly formed.

As the need arises, the LC circuit 1 is formed at one or more prescribed positions on the dummy wafer DW, thereby enabling the detection of the temperatures at the respective positions.

The LC circuit 1 is thus formed on the dummy wafer DW, as shown in FIG. 1. As a means for detecting the resonance frequency of the LC circuit 1, a dip meter 20, for example, is disposed in proximity to the dummy wafer.

Figure 4:
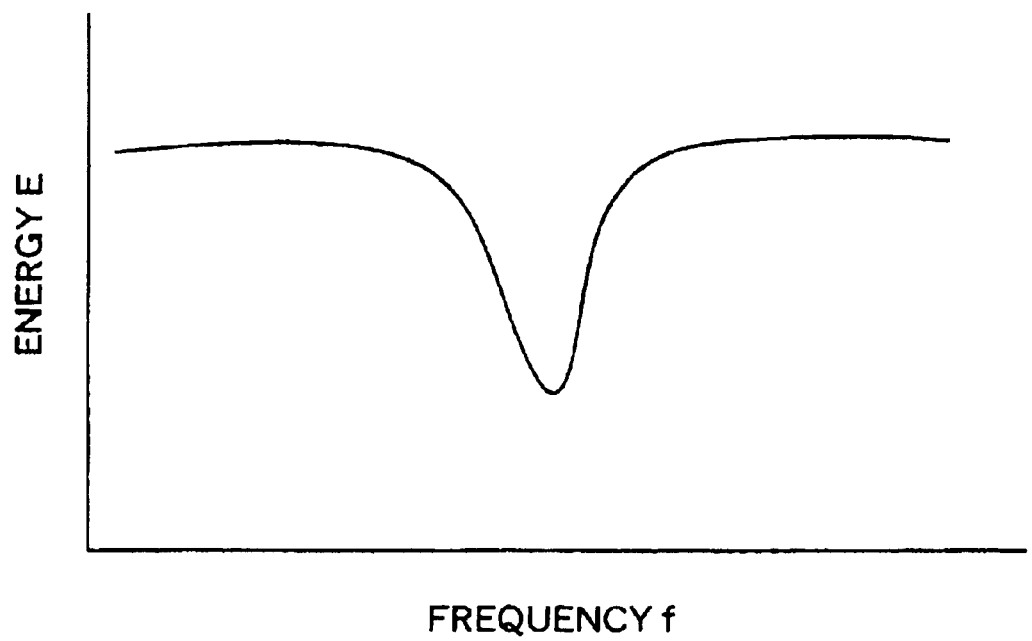
FIG. 4 is a diagram showing a relationship between frequency f and energy E of electromagnetic waves irradiated on a resonant circuit.

From an antenna 22, electromagnetic waves of a prescribed frequency region are oscillated while sweeping. When the frequency of the electromagnetic waves matches the resonance frequency of the LC circuit 1, energy is absorbed by the LC circuit 1 as shown in FIG. 4. By making use of this property, the dip meter 20 is configured to detect the resonance frequency of the LC circuit 1.

The antenna 22 (the electromagnetic wave irradiation portion) radiates electromagnetic waves in the air to electromagnetically couple with a conductor with which the electromagnetic waves are interlinked. Thereby, an oscillator is formed which includes an external conductor as part of load thereof. Accordingly, when electric energy oscillated in the oscillator is converted into electromagnetic wave energy by means of the antenna 22, by detecting the variation with the frequency of a current or a voltage outputted from the oscillator, the resonance frequency of the LC circuit 1 that is an external circuit can be detected.

A detection result due to the aforementioned dip meter 20 is inputted to a processor 24, which calculates a temperature of the dummy wafer DW from the resonance frequency of the LC circuit 1.

In general, the resonance frequency (fr) of the LC circuit 1, with inductance of the coil 2 L and capacitance of the condenser 3 C, is expressed by $$fr = 1/[\pi(LC)^{1/2}].$$

Figure 5:
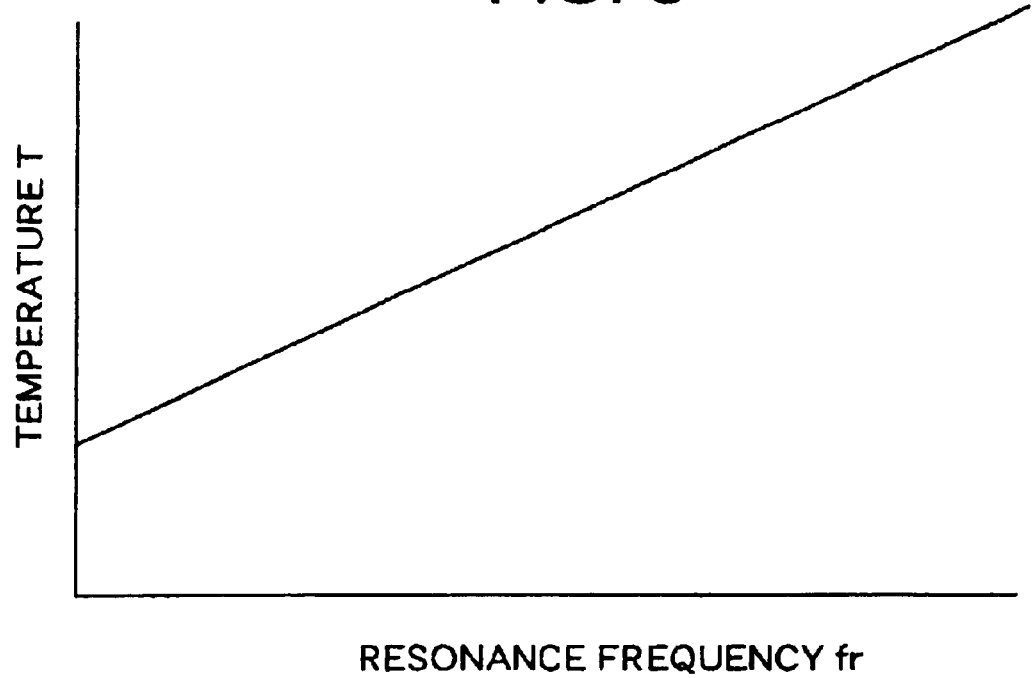
FIG. 5 is a diagram showing a relationship between resonance frequency fr and temperature T.

Furthermore, the inductance L of the coil 2 and the capacitance C of the condenser 3 are temperature-dependent; that is, they vary according to the temperature. Accordingly, the resonance frequency also is temperature-dependent, as shown in FIG. 5 in which the ordinate is temperature T and the abscissa is resonance frequency fr. This relationship between the temperature T of the LC circuit 1 and the resonance frequency fr stored in the processor 24 as data. In this manner, an accurate temperature of the dummy wafer DW can be obtained from the value of the resonance frequency fr thereof.

Although the aforementioned resonance frequency fr may be selected arbitrarily, from the point of view of resolving power in temperature measurement, it is preferably in the range of approximately 0.1 MHz to approximately 1000 MHz. Accordingly, the values of the inductance of the coil 2 and the capacitance of the condenser 3 are preferably selected so that the resonance frequency of the LC circuit 1 may be in that range.

Figure 6:
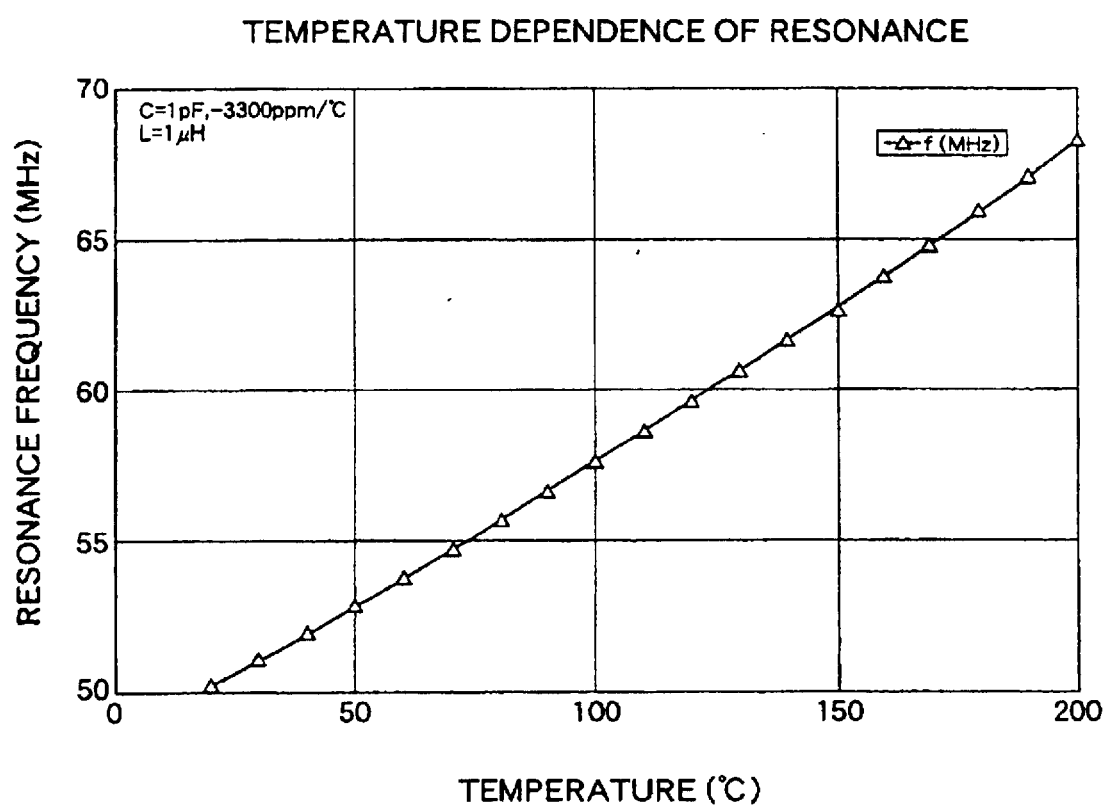
FIG. 6 is a diagram showing one example of a relationship between the resonance frequency and temperature in FIG. 5.

For instance, if the inductance of the coil 2 is 1 $\mu$H, the capacitance of the condenser 3 is 1 pF, and the temperature characteristic of the condenser 3 is −3300 ppm/° C., the relationship of the temperature T and the resonance frequency fr as shown in FIG. 6 can be obtained. From the relationship, the temperature corresponding to the resonance frequency can be obtained by the use of the processor 24.

Before starting the processing of the product wafers the dummy wafers DW with the LC circuit 1 formed thereon, are disposed at the wafer processing portions of various kinds of processing equipment, so that the dummy wafers DW are processed similarly with the product wafers, and the temperatures at that are being measured.

The temperature measurements at that time are fed back when processing the product wafers. Thereby, the product wafer can be processed in a state more accurately controlled to a desired processing temperature.

For instance, in a series of lithography steps using a photo resist for the product wafer, in a so-called oven or the like, the product wafers are heat-treated one by one after mounting on a hot plate. In that case, for instance before starting the processing of the product wafer, the dummy wafer DW is mounted on the hot plate and heat-treated similarly with the product wafer.

The antenna 22 of the dip meter 20 is disposed in advance above the oven, whereby an actual temperature of the dummy wafer DW during the processing is measured to detect the extent of an error that occurs between the preset temperature of the oven and an actual temperature of the dummy wafer DW. When processing the product wafer, the preset temperature of the oven is adjusted so that such an error may become smaller, whereby the product wafer being processed accurately at a desired processing temperature.

As to the dip meter 20, only the antenna portion 22 thereof is disposed in the neighborhood of the oven and a body portion thereof is disposed separated from the oven. Thereby, the temperature of the dummy wafer DW can be measured without suffering an influence of heat from the oven.

In the aforementioned temperature measurement, it may be required to measure a temperature distribution at a plurality of points of the wafer such as, for instance, a central portion, a periphery portion and the like. In that case, a plurality of LC circuits 1 corresponding to such measuring points are mounted on the dummy wafer DW, and the temperature distribution at the plurality of measuring points is measured.

The antennas 22, corresponding in number to the respective LC circuits 1, may be disposed above the oven; or one or a plurality of antennas 22 may interact with a plurality of LC circuits 1, with the position of the antenna 22 being movable. When a plurality of antennas 22 are used, they can be sequentially electrically activated, thereby reducing the number of the dip meter bodies to fewer than that of the antennas.

As explained above, according to the present embodiment, on the dummy wafer DW the LC circuit 1 is directly formed to detect the resonance frequency thereof by means of the dip meter 20. Thereby, without coming into contact with the dummy wafer DW, the temperature of the dummy wafer DW can be accurately measured.

Furthermore, on the dummy wafer DW, other than the LC circuit 1, there is no need of disposing, for instance an amplifier or a processor to measure a temperature. Accordingly, since there is no need of considering the influence of temperature-dependence of these circuits, in a broader temperature range an accurate temperature measurement can be implemented.

The LC circuit 1 is formed on the dummy wafer DW, by the ordinary manufacturing steps for a semiconductor device such as lithography or the like. Accordingly, the LC circuit 1 can be formed on the dummy wafer on a manufacturing line for an ordinary semiconductor device.

In the example described above LC circuit 1 is formed directly on the dummy wafer DW. However, it is also possible that an LC circuit formed on another thin substrate can be stuck on the dummy wafer DW.

Furthermore, instead of on the dummy wafer DW, the LC circuit 1 may be formed directly on the product wafer. Alternatively, an LC circuit formed on another thin substrate is stuck on the product wafer. Thereafter, during the processing of the actual product wafer, the temperature of the product wafer can be measured directly. In that case, the temperature of the product wafer being processed can be measured in real time to control the temperature thereof.

In addition to the aforementioned heat treatment in an oven, the present method can be applied in any processing, such as various kinds of film formation, etching, coating of the photo resist and developing. In all of these, the processing is implemented while controlling the temperature.

In the example described above, the resonance frequency is measured using a dip meter 20. However, the resonance frequency can also be measured with the antenna attached to an impedance meter.

Next, another example of a process for forming the LC circuit 1 on the dummy wafer DW by means of lithography or the like will be explained with reference to FIGS. 7A, 7B, 7C, 7D, 7E and 7F and 8A and 8B.

Figure 7A:
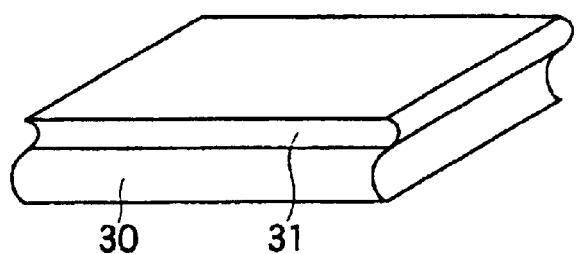
FIGS. 7A, 7B, 7C, 7D, 7E and 7F are diagrams showing the steps for forming a resonant circuit utilized in the present invention, the steps being different from those shown in FIGS. 3A through 3F and FIGS. 4A through 4D.
Figure 7B:
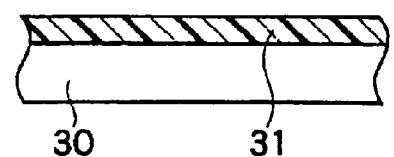
Figure 7C:
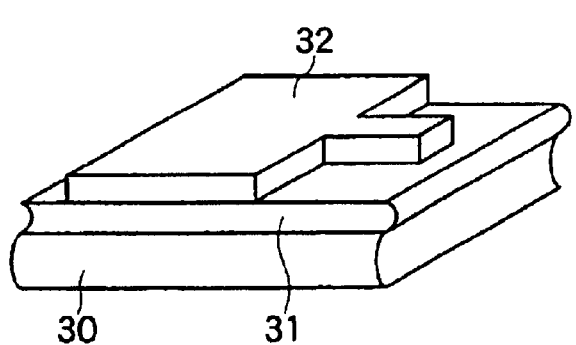
Figure 7D:
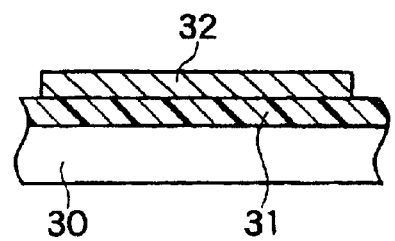

First, a $SiO_2$ layer 31 is formed on a Si layer 30 on a dummy wafer DW (FIGS. 7A and 7B). Thereafter, for instance a Poly-Si layer, an Al layer or the like is formed thereon, followed by patterning by the photolithography. Alternatively, mask sputtering of Al or the like is implemented. Thereby, on the $SiO_2$ layer 31, a lower electrode layer 32 of a prescribed shape is formed (FIGS. 7C and 7D).

Figure 7E:
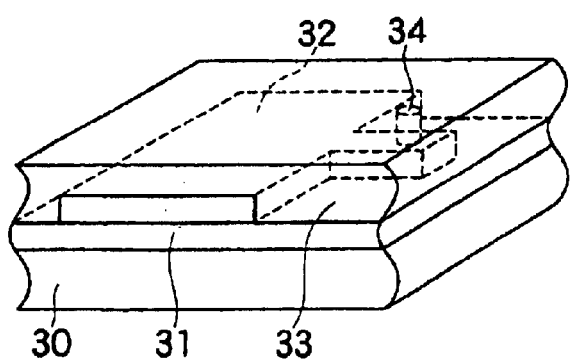
Figure 7F:
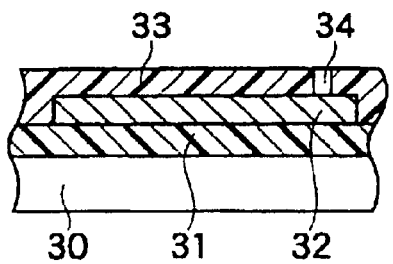

Next, on the lower electrode layer 32 a dielectric layer that forms the dielectrics in a capacitor (a $SiO_2$ layer 33 for instance) is formed by a CVD method or the like. Thereafter, a contact hole 34 is partially formed on the $SiO_2$ layer 33 by means of the photolithography or the like with the photo resist (FIGS. 7E and 7F).

Figure 8B:
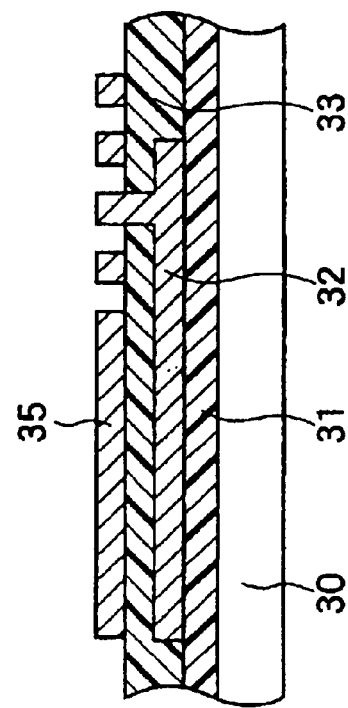
FIGS. 8A and 8B, continuation of FIGS. 7A through 7F, are diagrams showing the steps for forming a resonant circuit involving the present invention.
Figure 8A:
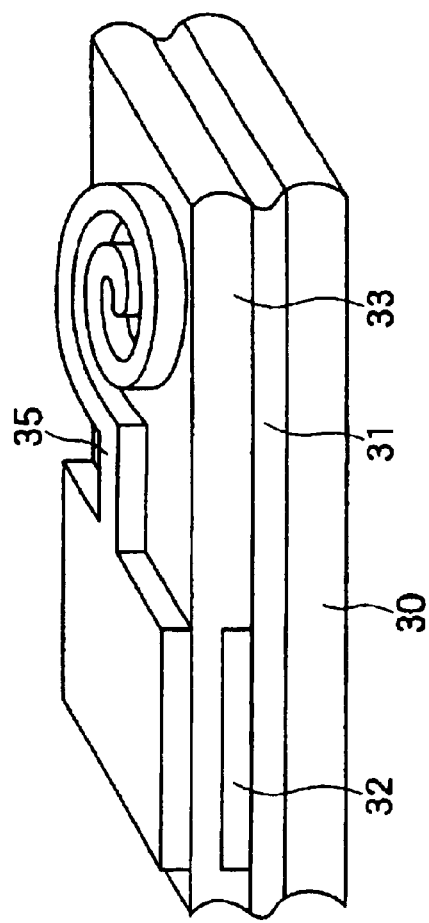

Further thereafter, on the $SiO_2$ layer 33 and in the contact hole 34, for instance a Poly-Si layer, an Al layer or the like is formed, followed by patterning by means of the photolithography or the like. Alternatively, mask sputtering of Al or the like is implemented. Thereby, an upper electrode layer 35 of a prescribed shape is formed (FIGS. 8A and 8B).

In addition, as needs arise, a protective film can be applied on the LC circuit formed as mentioned above. The situation is the same with the aforementioned process.

According to the above process too, an LC circuit having the following configuration can be directly formed on the dummy wafer DW (or product wafer). That is, in the LC circuit, the lower and upper electrode layers 32 and 35 are interconnected through the contact hole 34 and disposed with the $SiO_2$ layer 33 interposed as the dielectric layer, and the spiral coil portion is formed.

In the aforementioned two examples, the coil shape of the LC circuit is an approximately spiral one. However, the coil shape is not restricted to a spiral; rather, it can be formed in any shape that can work as coil.

Figure 9:
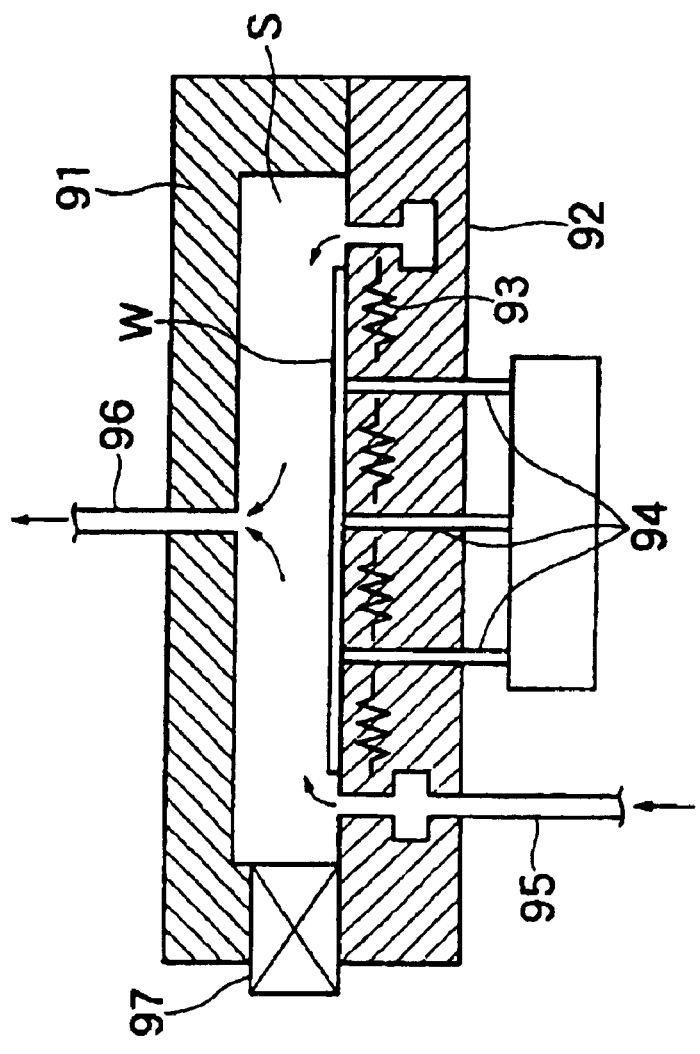
FIG. 9 is a front section view showing schematically an aging unit of coated film that is semiconductor manufacturing equipment involving the present invention.
Figure 10:
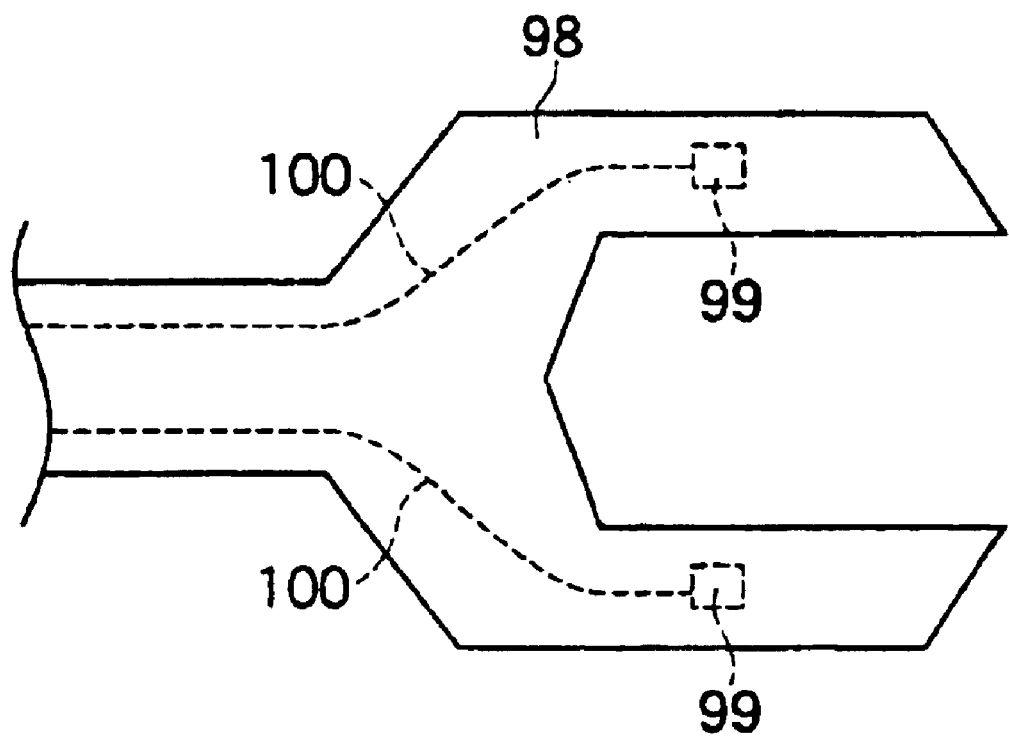
FIG. 10 is a plan view showing schematically a substrate transfer arm shown in FIG. 9.

Next, as one example of semiconductor manufacturing equipment that is another embodiment of the present invention, an aging unit of coated film will be explained with reference to FIGS. 9 and 10. FIG. 9 is a front section view showing schematically an aging unit for the coated film, while FIG. 10 is a plan view showing schematically a substrate transfer arm for the apparatus shown in FIG. 9.

In the present embodiment, the aforementioned substrate temperature measuring method is applied in the aging unit of the coated film to measure the temperature of the wafer after processing. Thereby, validation of the processing temperature and fine adjustment of the processing temperature on the basis of the measured temperature are possible.

As shown in FIG. 9, the aging unit for the coated film comprises a heating plate 92, a cap 91, a gas supply route 95, an exhaust route 96, three elevating pins 94, and a gate valve 97. The heating plate 92 is made of for instance ceramics, and houses a heater 93. The cap 91 comes closely in contact through sealing member with a periphery of the heating plate 92 to form a processing space S that is a processing chamber above the heating plate 92. In the gas supply route 95, gas inlets are formed on a surface of the heating plate 92 to surround a wafer mounted on the heating plate 92. The exhaust route 96 is provided with a sucking opening in a central portion of the cap 91. The three elevating pins 94 move the wafer up and down between the heating plate 92 and an upper position thereof. The gate valve 97 allows the water W in and out of the processing space S.

In the aging unit for coated film, ammonia is vaporized, fed into the processing chamber through the aforementioned gas supply route 54 and exhausted from the exhaust route 55. Thereby, while the wafer W is heated, the coated film is aged. (Such aging is used as a process of forming an interlayer insulating film on the wafer for instance.)

A wafer W having a coated film that is to be aged, is inserted into the aging unit, whose gate valve 97 is opened, while a bottom surface the wafer is supported from beneath by a wafer transfer arm 98. For that purpose, the elevating pins 94 are in a lowered state, and the wafer transfer arm is moved horizontally to a prescribed position in the processing chamber S. The wafer W is delivered to the elevating pins 94 by an ascending movement of the latter.

After the wafer W is delivered onto the elevating pins 94, the wafer transfer arm retreats horizontally away from the processing chamber. Thereafter, the elevating pins 94 are lowered, the gate valve is closed, and the wafer W is heated by the heating plate 92 up to a prescribed temperature, so that a state ready for processing the wafer is prepared. In that state, the aforementioned processing for aging is implemented.

After the processing is completed, the gate valve 97 is opened, and the arm 98 in a wafer non-transfer state is inserted in the processing space S. The electromagnetic wave irradiation portion 99 (corresponding to the antenna 22 in FIG. 1) is mounted on a rear surface of the arm 98. By using the resonant circuit formed on the wafer W, the temperature of the wafer is measured. Accordingly, whether the wafer is processed at the prescribed temperature or not can be known. Furthermore, based on the results, output power of the heater 93 of the heating plate 92 can be finely adjusted thereafter.

After measurement, the wafer transfer arm 98 is withdrawn from the processing space S, and the elevating pins 94 are raised to clear the bottom surface of the wafer W, clearing a space for the wafer transfer arm 98 to be inserted again. Then, the elevating pins 94 are lowered to deliver the wafer W to the wafer transfer arm 98, and the wafer transfer arm 98 and the wafer are removed from the processing space S.

In the aging unit of coated film explained in the above, the wafer W can be a dummy wafer for temperature measurement or a product wafer in part of which a resonant circuit is built-in in advance.

The electromagnetic wave irradiation portion 99 is disposed at a distance from the dip meter or the like, with a transmission line 100 extending from the dip meter to a rear surface of the wafer transfer arm 98. In this example, as shown in FIG. 10, the electromagnetic wave irradiation portions 99 are disposed at two places on the rear surface of the wafer transfer arm 98. However, the number of the electromagnetic wave irradiation portions may be appropriately increased or decreased. The disposition at many locations enables simultaneous measurement of the temperatures of many positions on the wafer. Furthermore, with the wafer transfer arm moving in a horizontal direction, a single electromagnetic wave irradiation portion 99 irradiates in turn a plurality of resonant circuits on the wafer to measure the temperatures there.

Figure 11:
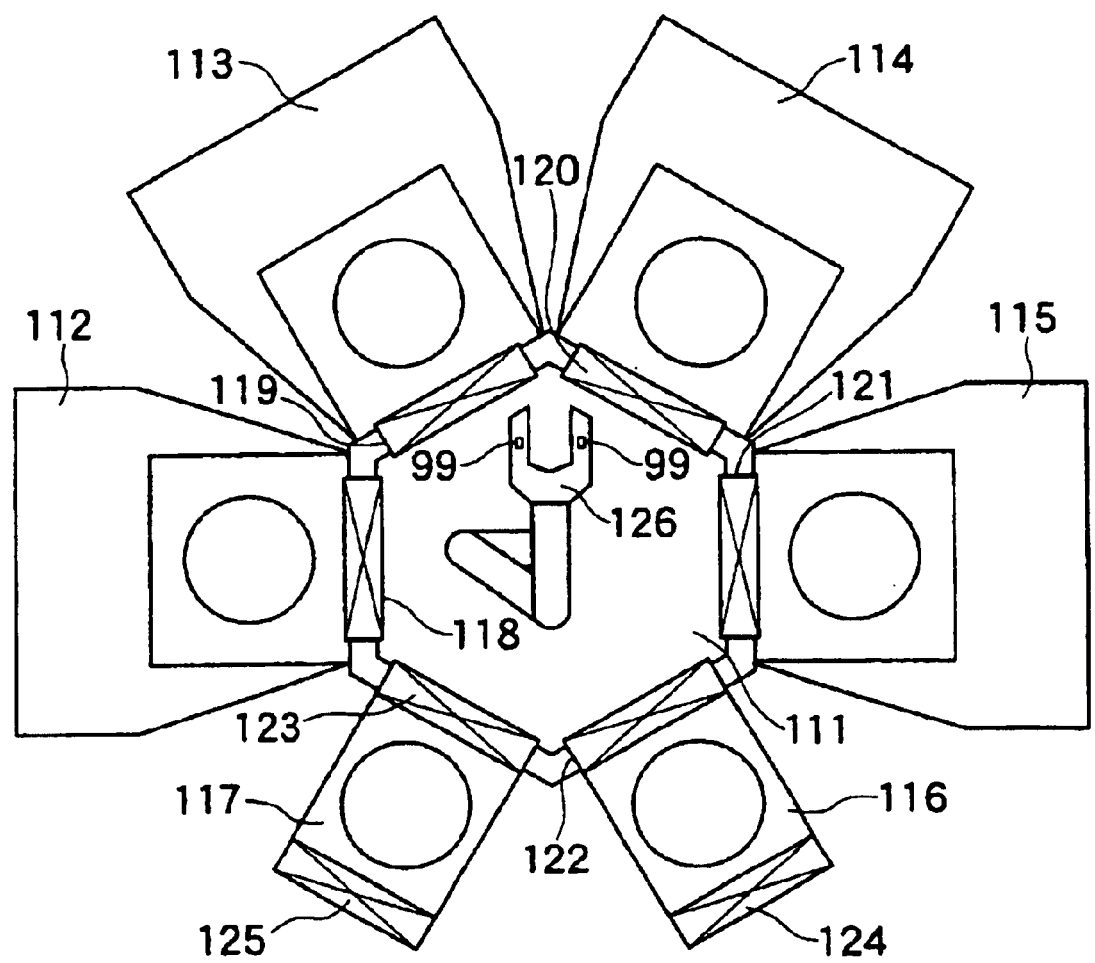
FIG. 11 is a plan view showing schematically a cluster tool that is semiconductor manufacturing equipment involving the present invention.

Next, as another embodiment of the semiconductor manufacturing equipment of the present invention, a cluster tool will be explained with reference to FIGS. 11 and 12. FIG. 11 is a plan view showing schematically a cluster tool for semiconductor manufacturing according to the present invention, while FIG. 12 being a plan view showing the measurement of temperature in the cluster tool shown in FIG. 11.

In the present embodiment, a wafer transfer arm capable of measuring the temperature such as explained in the aforementioned embodiment is installed in a cluster tool. In the cluster tool, a wafer that is a processing object is subjected to various kinds of processing such as film formation, annealing, and removal of native oxide film.

As shown in FIG. 11, the cluster tool is disposed with processing chambers 112 to 115 for carrying out the aforementioned various kinds of processing and a transfer chamber 111 capable of evacuating. The processing chambers 112 to 115 and the transfer chamber 111 are connected through gate valves 118 to 121.

Load lock chambers 116 and 117 communicate through gate valves 122 and 123 with the transfer chamber 111, and a processing object can be sent in and out through the gate valves 122 and 123 between the load lock chambers 116 and 117 and the exterior.

In the processing chambers 112 to 115, susceptors mounting the processing objects each are disposed, the processing object being subjected to various kinds of processing such as film formation, annealing and removal of native oxide film.

An extendable and rotatable wafer transfer arm 126 is disposed, in the transfer chamber 111, delivering the processing object among the respective processing chambers 112 to 115 and to and from the load lock chambers 116 and 117. Furthermore, the electromagnetic wave irradiation portion 99 is disposed on the rear surface of the wafer transfer arm 126. Though omitted in the drawing, from the electromagnetic wave irradiation portion 99 a transmission line is extended up to a dip meter to connect.

A wafer susceptor and a vacuum pump (not shown) are furnished to each of the load lock chambers 116 and 117. The wafer transfer arm 126 transfers the processing object mounted on the wafer susceptor to the processing chambers 112 to 115. Thereby, the processing object can be delivered without exposure to the air.

In the cluster tool, the load lock chambers 116 and 117, the transfer chamber 111 and the processing chambers 112 to 115 all can be independently evacuated. The vacuum can be increased in an ascending order of the load lock chambers 116 and 117, the transfer chamber 111 and the processing chambers 112 to 115. When inserting the processing object into the processing chambers 112 and 115, first the processing object is sent in the load lock chamber 116 or 117. The wafer that is sent in the load lock chamber 116 or 117 is sent in the transfer chamber 111 by means of the wafer transfer arm 126. The processing object that is sent into the transfer chamber 111 is sent in the processing chambers 112 to 115 by means of the wafer transfer arm 126.

Thereby, even when the processing object is sent in and out of the processing chambers 112 to 115, the inside of the processing chambers 112 to 115 can be prevented from being exposed to the atmosphere. Accordingly, the insides of the processing chambers 112 to 115 can be prevented from being contaminated, and particles in the air can be prevented from intruding into the processing chambers 112 to 115. As a result, high precision processing can be realized.

Furthermore, when transferring the processing object from the processing chamber 112 to the chamber 113, even when the processing object is transferred from the processing chamber 113 to the chamber 114, similarly the processing object can be prevented from being contaminated by the air.

Figure 12:
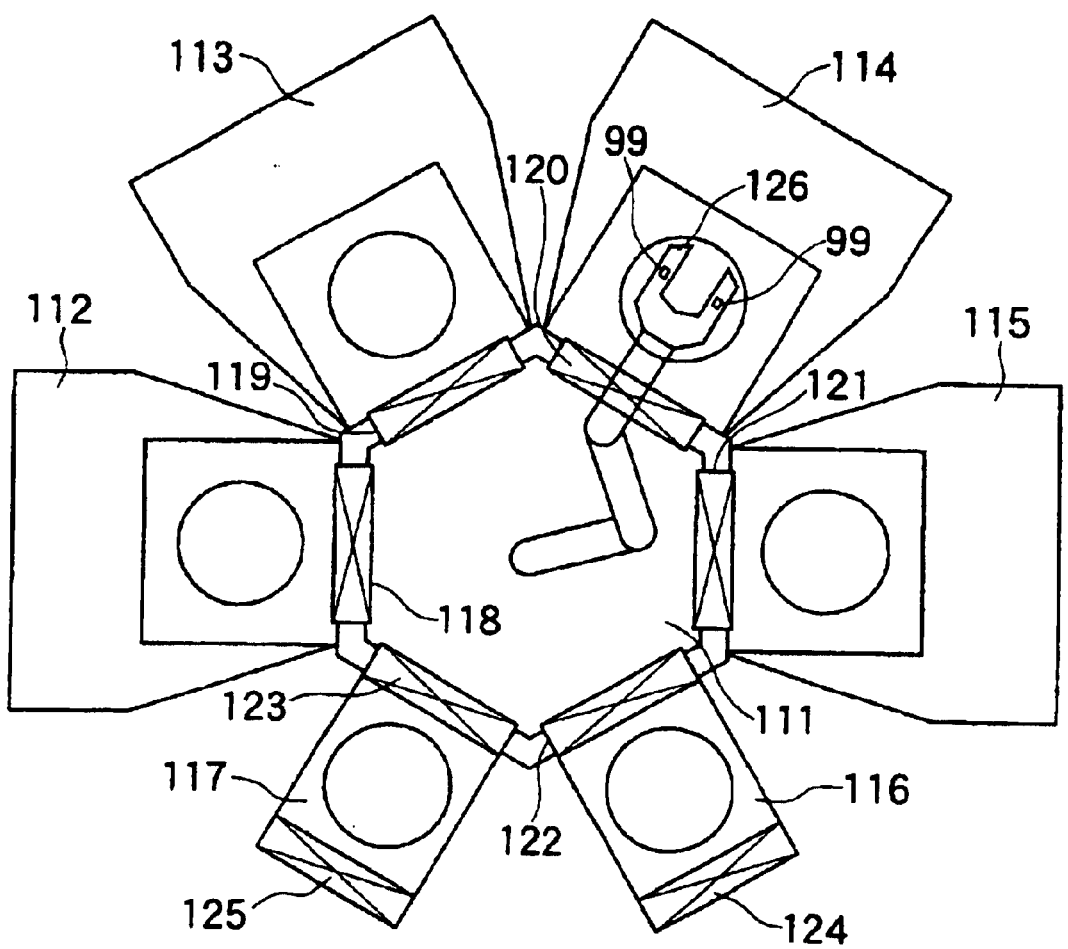
FIG. 12 is a plan view showing the case of measuring a temperature in the cluster tool shown in FIG. 11.

When measuring the wafer temperature, as shown in FIG. 12, the wafer transfer arm 126 is inserted in the processing chamber. At that time, the wafer transfer arm 126 is inserted as if holding high upward of the wafer in the processing chamber. Thereby, from the electromagnetic wave irradiation portions 99 disposed on the rear surface of the wafer transfer arm 126 onto the resonant circuits previously formed on the wafer, electromagnetic waves are irradiated to enable to measure the temperatures of those portions.

By incorporating the temperature measuring method of the present invention into the cluster tool, in the various kinds of processing the substrate temperature can be measured in the cluster tool immediately upon completion, so that the validation can be confirmed. In addition, according to the result, the processing temperature can be finely adjusted. Accordingly, highly accurate temperature management, high can be realized.

Figure 13:
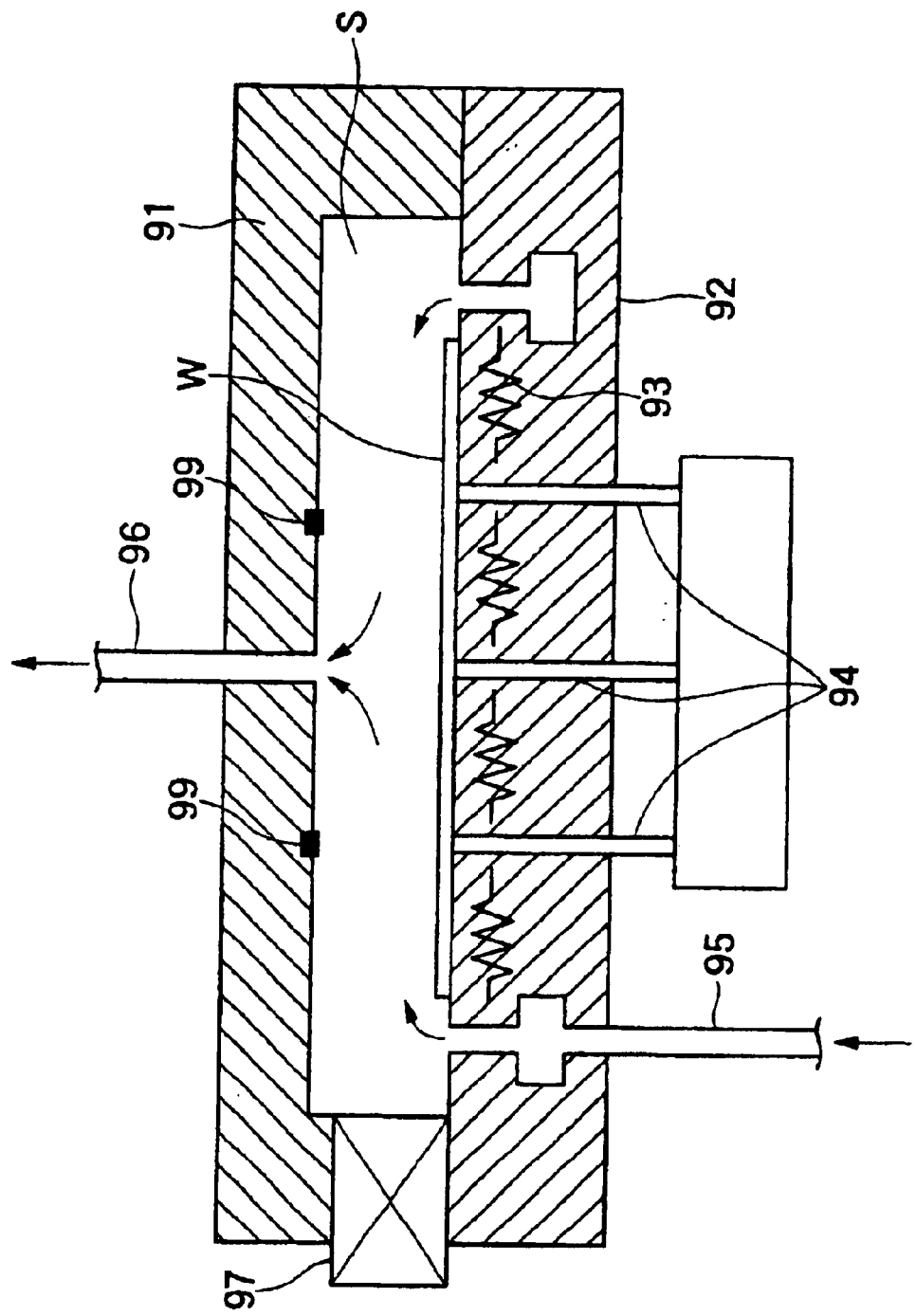
FIG. 13 is a front section view showing schematically an aging unit of coated film that is semiconductor manufacturing equipment involving the present invention, the aging unit being different from one shown in FIG. 9.

Next, in another embodiment of the semiconductor manufacturing equipment according to the present invention, an aging unit of coated film will be explained with reference to FIG. 13, which is a front section view schematically showing the aging unit of coated film. (Already explained elements have the same reference numerals.)

In the present embodiment, the electromagnetic wave irradiation portion 99 is disposed opposite to the wafer W in the processing space S. Furthermore, though omitted in the drawing, from the electromagnetic wave irradiation portion 99 the transmission line is extended up to a dip meter to connect.

Due to the disposition of the electromagnetic wave irradiation portion 99 in the processing space S, during the processing the temperature of the wafer W can be measured in real time. As a result, the temperature can be adjusted with higher accuracy than in the aforementioned temperature measurement after the processing. Accordingly, the wafer can be processed with high accuracy.

As explained above, according to the present invention, the substrate temperature measuring method, substrate processing, substrate temperature measuring equipment, and semiconductor manufacturing equipment that can accurately measure the temperature of the substrate and can process the substrate with higher accuracy than in the existing method can be provided.

INDUSTRIAL APPLICABILITY

The substrate temperature measuring method and substrate processing involving the present invention can be applied when a semiconductor substrate or an LCD substrate is manufactured. Accordingly, the aforementioned methods can be applied in semiconductor manufacturing industry and LCD manufacturing industry.

Furthermore, the substrate temperature measuring equipment and the semiconductor manufacturing equipment of the present invention can be used when manufacturing a semiconductor substrate or a LCD substrate, in addition being manufactured in the manufacturing industry of semiconductor manufacturing equipment. Accordingly, the aforementioned equipment can be applied in the semiconductor device manufacturing industry, semiconductor manufacturing industry and LCD manufacturing industry.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for measuring the temperature of a substrate during processing thereof in a processing chamber, said method comprising:
    providing at least one resonant circuit formed on a surface of said substrate;
    moving the substrate into and out of the processing chamber via a substrate transfer arm;
    while the substrate is being processed in the processing chamber, irradiating the at least one resonant circuit with electromagnetic energy of an electromagnetic field generated by a radiation device;
    determining a resonant frequency of said at least one resonant circuit by detecting an effect of said resonant circuit on said electromagnetic field; and
    determining a temperature for each of said at least one resonant circuit as a function of said resonant frequency.

2. The substrate temperature measuring method as set forth in claim 1:
    wherein the resonant circuit is directly formed on the substrate.

3. The substrate temperature measuring method as set forth in claim 1:
    wherein the resonant circuit is stuck on the substrate.

4. The substrate temperature measuring method as set forth in claim 1:
    wherein the resonant circuit has a resonance frequency in a range of 0.1 MHz to 1000 MHz.

5. The substrate temperature measuring method as set forth in claim 1:
    wherein the substrate is one for temperature measurement.

6. The substrate temperature measuring method as set forth in claim 1:
    wherein the substrate is a product substrate.

7. The method according to claim 1, wherein:
    said radiation device irradiates each of said at least one resonant circuit by movement of the transfer arm, without transferring the substrate.

8. A method of processing a product having a product circuit pattern for performing a desired function, formed on a substrate, said method comprising:
    forming on said substrate, in addition to said product circuit pattern, at least one circuit pattern comprising a resonant circuit;
    during processing of said product in a processing chamber, irradiating each resonant circuit of said at least one circuit pattern with electromagnetic energy in an electromagnetic field;
    determining a resonant frequency of each resonant circuit of said at least one circuit pattern by detecting an effect of said resonant circuit on said electromagnetic field;
    determining a temperature of said product during said processing as a function of said resonant frequency; and
    moving said substrate into and out of said processing chamber via a substrate transfer arm;
    wherein said electromagnetic field is generated by a radiation device which is disposed on said transfer arm.

9. The substrate temperature measuring method as set forth in claim 8:
    wherein the substrate is provided with a plurality of resonant circuits;
    the electromagnetic energy is radiated from a plurality of electromagnetic wave radiation devices onto each of the plurality of resonant circuits;
    a resonance frequency is detected of each of the plurality of resonant circuits; and
    the step of determining the temperature of the substrate as a function of the detected resonance frequency is carried out for a plurality of areas of the substrate.

10. The method according to claim 8, wherein:
    said radiation device irradiates each of said at least one resonant circuit pattern by movement of the transfer arm without transferring the substrate.

11. A method for measuring temperature of a substrate having a plurality of resonant circuits disposed thereon, said method comprising:
    converting electric energy into electromagnetic wave energy;
    radiating the electromagnetic wave energy from an electromagnetic wave irradiation portion onto the substrate;
    moving the electromagnetic wave irradiation portion;
    detecting a voltage or a current associated with the electric energy to detect resonance frequencies for each of the plurality of resonant circuits, during movement of the irradiation portion; and obtaining temperatures of a plurality of areas of the substrate from the detected resonance frequencies.

12. The substrate temperature measuring method as set forth in claim 11, wherein, during measurement of said temperatures, the substrate is disposed in a substrate processing space;

the substrate is moved in and out of the substrate processing space by means of a substrate transfer arm;

the electromagnetic wave irradiation portion is furnished on the substrate transfer arm; and movement of the electromagnetic wave irradiation portion is carried out, without transferring the substrate, by moving the substrate transfer arm.

13. The substrate temperature measuring method as set forth in claim 12:

wherein movement of the electromagnetic wave irradiation portion is implemented after substrate processing is over in the substrate processing space.

14. Semiconductor manufacturing equipment, comprising:

a substrate temperature measuring portion having an electromagnetic wave irradiation portion by which electric energy is converted into electromagnetic wave energy, which is radiated onto a resonant circuit on a substrate;

a resonance frequency detecting portion which detects a voltage or a current associated with the electric energy to determine a resonance frequency of the resonant circuit;

a temperature processor by which a temperature of the substrate is obtained from the detected resonance frequency;

a processing chamber for processing the substrate; and a substrate transfer arm by which the substrate is sent in and out of the processing chamber;

wherein the electromagnetic wave irradiation portion of the substrate temperature measuring portion is disposed on the substrate transfer arm.

* * * * *